United States Patent
Horiwitz et al.

(10) Patent No.: US 6,785,901 B1
(45) Date of Patent: Aug. 31, 2004

(54) ALTERING LOCKS ON PROGRAMMING CONTENT

(75) Inventors: Steven M. Horiwitz, Los Altos, CA (US); Jeff Yaksick, Sunnyvale, CA (US)

(73) Assignee: WEBTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/575,413

(22) Filed: May 19, 2000

(51) Int. Cl.[7] .............................. H04N 7/16; H04N 5/76
(52) U.S. Cl. .............................. 725/25; 725/28; 725/27; 725/58; 725/85; 725/100; 725/139; 386/1; 386/83
(58) Field of Search ............................... 725/25–31, 68, 725/85, 100, 139–142, 151–153, 58; 386/1, 83

(56) References Cited

U.S. PATENT DOCUMENTS

| | | | | |
|---|---|---|---|---|
| 5,805,763 A | * | 9/1998 | Lawler et al. ................. | 386/83 |
| 5,930,446 A | * | 7/1999 | Kanda .......................... | 386/52 |
| 6,014,184 A | * | 1/2000 | Knee et al. .................... | 725/45 |
| 6,144,401 A | * | 11/2000 | Casement et al. ............. | 725/30 |
| 6,167,188 A | * | 12/2000 | Young et al. ................. | 386/83 |
| 6,226,793 B1 | * | 5/2001 | Kwoh .......................... | 725/28 |
| 6,239,794 B1 | * | 5/2001 | Yuen et al. .................... | 725/41 |
| 6,388,714 B1 | * | 5/2002 | Schein et al. ................ | 348/563 |
| 6,462,753 B1 | * | 10/2002 | Koyata et al. ............... | 345/716 |
| 6,469,753 B1 | * | 10/2002 | Klosterman et al. ........ | 348/552 |
| 6,473,559 B1 | * | 10/2002 | Knudson et al. ............. | 386/83 |
| 6,505,348 B1 | * | 1/2003 | Knowles et al. ............. | 725/49 |
| 6,614,987 B1 | * | 9/2003 | Ismail et al. ................. | 386/83 |

* cited by examiner

Primary Examiner—John Miller
Assistant Examiner—Annan Q. Shang
(74) Attorney, Agent, or Firm—Workman Nydegger (57) ABSTRACT

The present invention provides systems and methods for flexible locking and unlocking programming content. Programming content and the content of the programming content is often described by electronic program guide (EPG) data or guide data. Using the guide data, a user is able to create, alter and unlock locks on the programming content. Locking and unlocking the programming content can be based on characteristics of the programming content such as the duration of the programming content, start times of the programming content, end times of the programming content, content descriptors and ratings of the programming content and the like. The ability to create and unlock locks is flexible and can be directed specifically to particular programs within a channel or to specific channels. The ability to create and unlock locks can further be based on user profiles such that the programming content provided to particular users is determined by the user's profile. The ability to alter locks on programming content enable a user to determine the programming content that will be accessible in a highly configurable manner.

35 Claims, 6 Drawing Sheets

| THU | 8:30 PM | 9:00 PM | 9:30 PM |
|---|---|---|---|
| 118 BET | Rap City | Comicview | |
| 120 HIST | 20th Century | Weapons at War | |
| 122 SCIFI | Close Encounters of the Third Kind | | |
| 124 A&E | Quincy | Matlock | |
| 129 BRAVO | A Man for All Seasons | | Love Boat |
| 130 AMC | A Farewell to Arms | | |

Quincy
9:00 PM - 10:00 PM   TV-PG
Quincy is outraged when two low-income parents die while being transferred from a private hospital to a public facility.

105 TNT

THU OCT 28   8:41 PM

| | 8:30 PM | 9:00 PM | 9:30 PM |
|---|---|---|---|
| THU | | | |
| 118 BET | Rap City | Comicview | |
| 120 HIST | 20th Century | Weapons at War | |
| 122 SCIFI | Close Encounters of the Third Kind | | |
| 124 A&E | Quincy | Matlock | |
| 129 BRAVO | A Man for All Seasons | | |
| 130 AMC | A Farewell to Arms | | |

THU OCT 28  8:41 PM

Quincy
9:00 PM - 10:00 PM  TV-PG
Quincy is outraged when two low-income parents die while being transferred from a private hospital to a public facility.

105 TNT

801

ALTERING LOCKS ON PROGRAMMING CONTENT

BACKGROUND OF THE INVENTION

1. The Field of the Invention

The present invention relates to systems and methods for altering locks on programming content. More particularly, the present invention relates to systems and methods for locking and unlocking programming content based on data including program ratings, content identifiers, channel and program.

2. The Prior State of the Art

A variety of programming is currently available to be received by and viewed on a home entertainment system. The use of an antenna allows for the reception of programming transmitted by local television stations. The channels carrying the programming from the local television stations carry such programming as news broadcasts, game shows, affiliated network television shows, local television shows, sporting events, etc.

While in many situations the use of an antenna is adequate for providing a variety of programming on a home entertainment system, viewers frequently desire an increased programming selection to be available on their home entertainment system. To obtain a wider selection of programming, a cable box can be connected to the home entertainment system, thereby providing an increased number of channels. Various packages of cable channels can be purchased from a cable provider to augment the reception of local channels, including all-sports channels, all-weather channels, all-movie channels, all-music channels, channels dedicated to classic television programming, channels dedicated to adult entertainment, channels carrying programming in a non-English language, community service channels, and the like. The reception of a cable programming depends on the type of package purchased from the cable provider.

Programming is also available on home entertainment systems through the use of satellite systems. While some satellite systems provide programming packages that can be purchased from a provider, other satellite systems receive programming that is not restricted. Thus, a viewer of a home entertainment system can have a plethora of channels and corresponding programming available to choose from on the home entertainment system through the use of satellite systems, cable boxes and other set top boxes.

While the use of a set top box increases the variety of programming available on the home entertainment system by providing an increased number of channels, viewers frequently desire to restrict the kind of programming that can be watched on their home entertainment system in order to, by way of example, protect children from viewing programming produced for adult audiences. As such, television manufacturers, cable television providers and satellite providers allow viewers to block identified channels in order to facilitate such viewer desires. The techniques for blocking channels include using a bypass filter to block out the frequencies corresponding to the undesired channels or by unselecting the undesired channels from the pool of channels scanned by the television.

SUMMARY OF THE INVENTION

The present invention relates to systems and methods for locking and unlocking programming content. Programming content may be received from multiple sources, including the Internet, satellite programming providers, cable programming providers, and local television programming providers. Programming content is often received through a set top box and is often described through the use of guide data. The guide data, which is usually presented to a user in a grid or table format, allows a viewer to view what is contained in the programming content and informs a user of many different characteristics of the programming content such as the start and end times of a program, the duration of a program, which programs are on which channels and the like.

Other types of guide data that is usually provided to the user include content descriptions that assist a user in evaluating the programming content. These content descriptions are usually relayed to the user through the use of ratings and content identifiers. The ratings and content identifiers associated with the programming content are intended to apprise the user about the content of the programming.

Another type of guide data is content identifiers, which more specifically describe the programming content. As a result, combining ratings information with content identifiers can provide a reasonably accurate representation of the programming content. For example, programming content with a rating of PG-13 suggests that the programming content is inappropriate for those under 13 years of age while a rating of PG-13 coupled with a content identifier of V (violence) indicates that the programming content is inappropriate for children under 13 years of age because of the violent content.

In accordance with the present invention, various sources or types of guide data are used to flexibly lock and unlock the programming content based on selected guide data which may include, but is not limited to, program duration, program title, program start time, program end time, program ratings, program content identifiers, and the like.

In addition to locking and unlocking programming content based on these types of factors, profile locks can also be created or unlocked based on user profiles. Thus, when a particular user accesses the programming content through a set top box, locks may or may not be activated according to the profile of the user. For example, a lock can be created that locks all adult programming when the age in the profile of a particular user is under 21. Because profile locks typically require a user to log on the set top box, all programming content is typically locked until a user identifies themselves to the set top box. Alternatively, a default amount of programming content may be available to all users, but in order to view or access additional programming content, a user is required to log on the set top box. By requiring a user to log on and identify themselves to the set top box, the profile locks can be effectively enforced.

Locks can also be temporarily disabled by a user. This is advantageous because the user is relieved from having to unlock a lock and then later recreate the lock. Rather, the lock is temporarily disabled until some event occurs. An exemplary event would be disconnecting the set top box from a power source. In this case, the lock is re-enabled when the set top box is later turned on.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends both methods and systems for locking and unlocking programming content. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
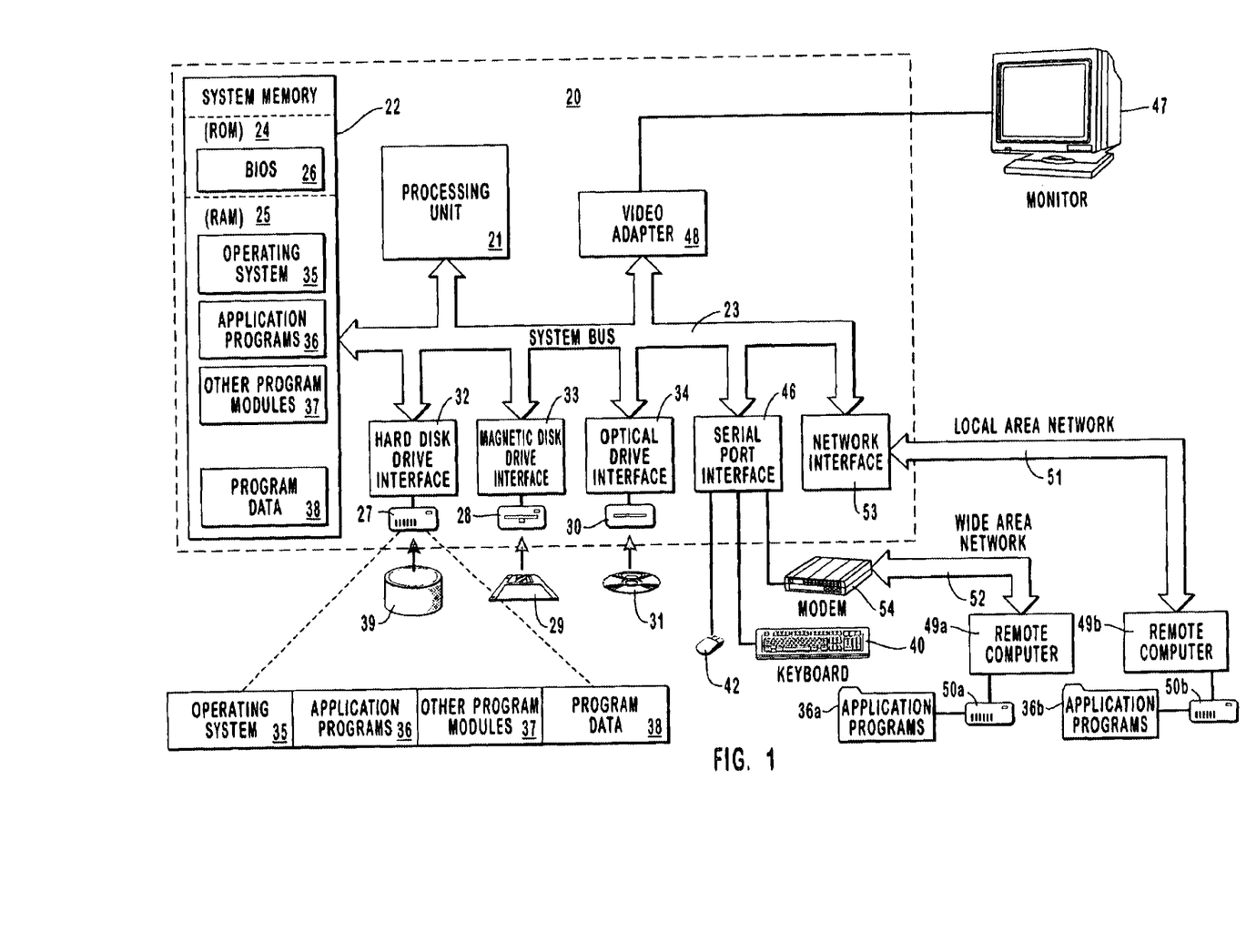
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, set top boxes, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port, infrared ports, radio frequency ports, or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

Figure 2:
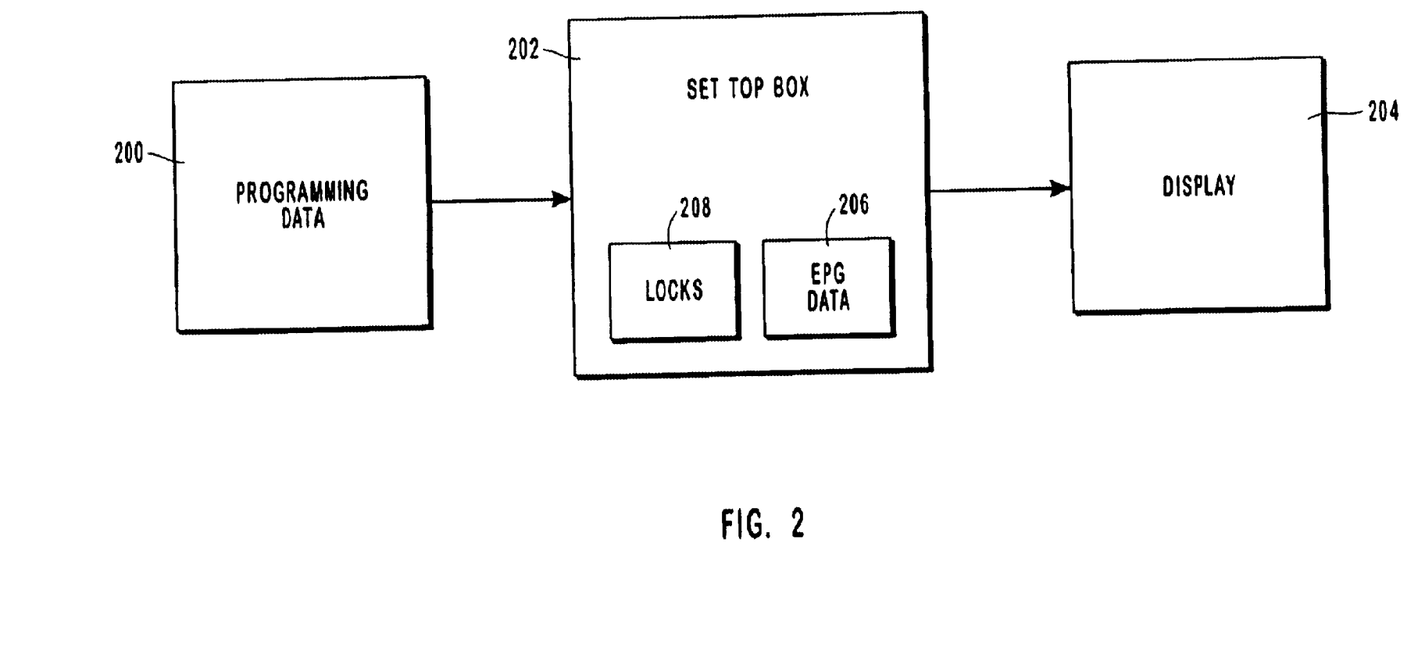
FIG. 2 illustrates a set top box capable of locking programming content using the electronic program guide (EPG) data associated with the programming content.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used. FIG. 2 is a block diagram illustrating an exemplary set top box that receives programming content that may be displayed to a user on a display device. The set top box 202, which receives programming content 200, is representative of analog and digital devices including, but not limited to, satellite receivers, digital recording devices, cable boxes, video game consoles and the like or any combination thereof. In addition, the set top box 202 typically includes a computer or portions of a computer as described with reference to FIG. 1. Additionally, the set top box 202 is usually capable of connecting with a network such as the Internet.

The programming content 200 is representative of the data that is received by the set top box 202, and may include, but is not limited to satellite transmissions, cable television transmissions, local television transmissions, radio transmissions, Internet data or transmissions, Motion Pictures Experts Group (MPEG) video, video streams, audio streams, and the like or any combination thereof. Programming content 200 also includes the content carried by satellite transmissions, cable transmissions, radio transmissions, local television transmissions and the like or any combination thereof. Included in the programming content 200 is electronic program guide (EPG) data 206, also referred to as guide data. Guide data 206 is a description of the programming content 200 and may include, but is not limited to, program titles, starting times, ending times, program ratings, program descriptions, program content identifiers, program duration, program reviews, and the like. More generally, the guide data 206, as used herein, refers to data or information that is related to or describes the programming content 200. The guide data 206 is usually processed by the set top box 202 and displayed to a user via the display 204, which may be a television set, a computer monitor, or other display device.

The set top box 202 also provides locks 208. The locks 208 may be created by a user or may already be present in the set top box 202 with regard to other users. The locks 208 provide the ability to limit the programming content 200 that is ultimately displayed on the display 204. The locks 208 may be unlocked either permanently or temporarily. In other words, locked programming content will not be displayed to a user on the display 204 unless the lock is temporarily or permanently removed from the programming content. In accordance with the present invention, it is often advantageous to temporarily unlock a lock because a user is relieved from having to recreate the lock. Altering a lock includes creating a lock, changing a lock, deleting a lock, enabling a lock, re-enabling a lock, restoring a disabled lock, unlocking a lock, and the like.

Figure 3:
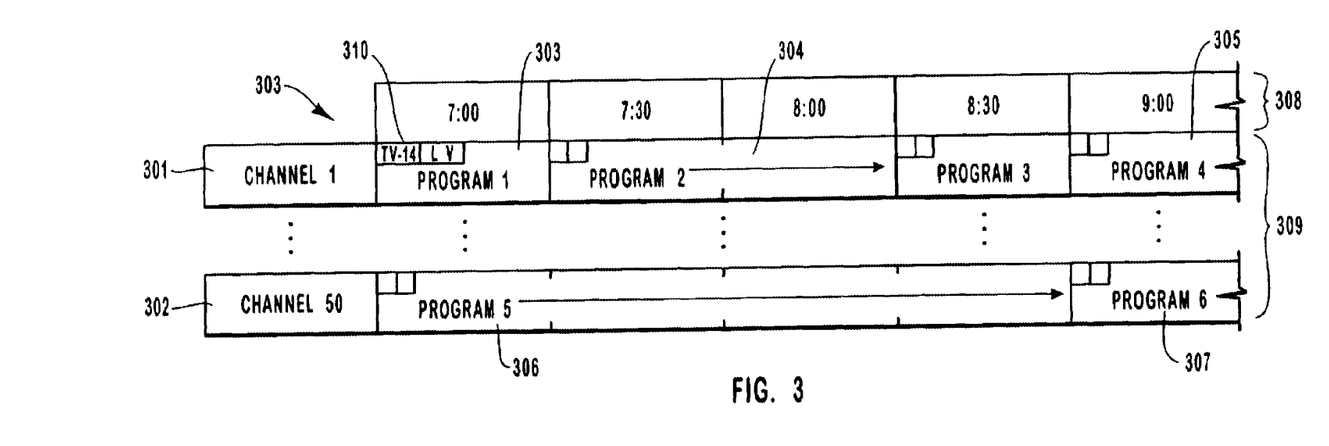
FIG. 3 illustrates a grid that displays guide data to a user.

FIG. 3 is an example of how some of the guide data 206 may be displayed to a user. The display of the guide data 206 may also illustrate to a user which programs are locked. For example, a visual cue may be provided within the guide data 206 to indicate the status of a particular channel or program to a user. For example, if program 1 is locked and program 2 is unlocked, then the background of box 303, which displays program 1, may be lighter or darker that the box 304 displaying program 2. Yet another color, shade difference, or other symbol may be used if, for example, an unlocked program is scheduled to be recorded. More simply, the user interface can convey information regarding the status of programming content in multiple ways, including alphanumerical and visual cues.

Figure 7:
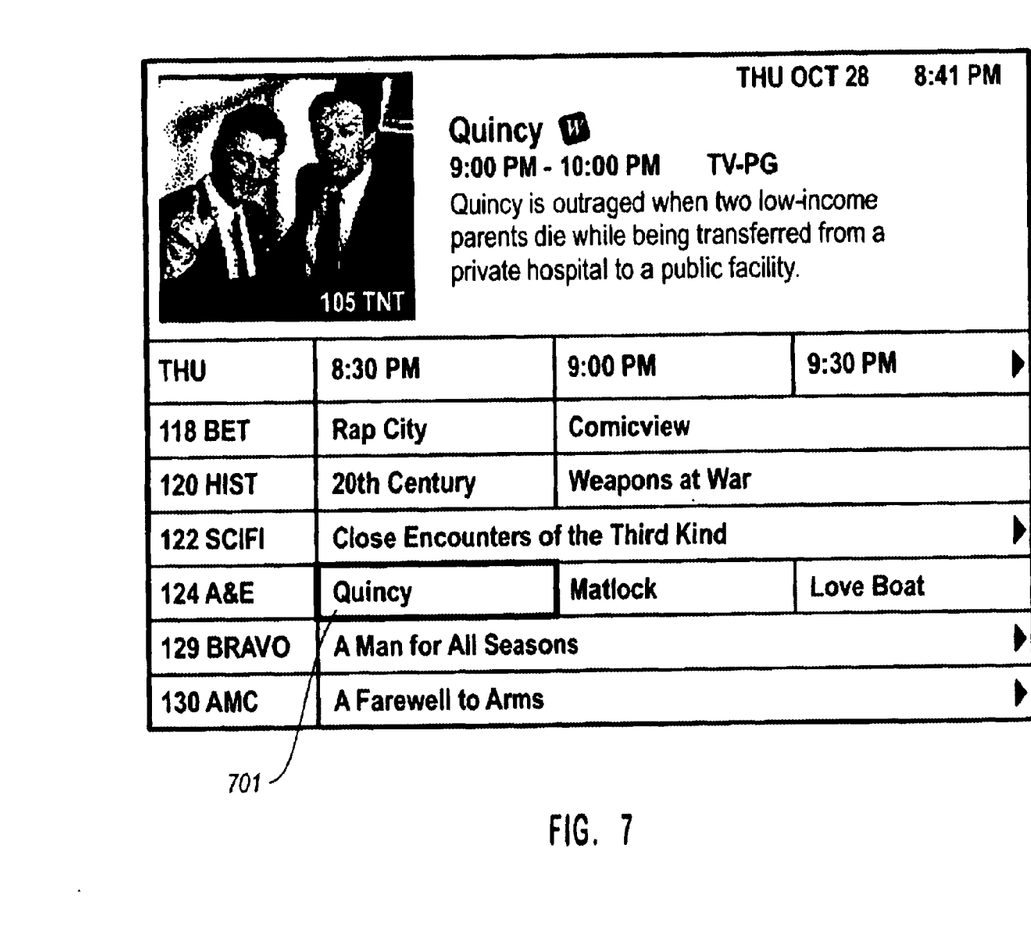
FIG. 7 is a screen shot illustrating guide data that shows unlocked programming content.
Figure 8:
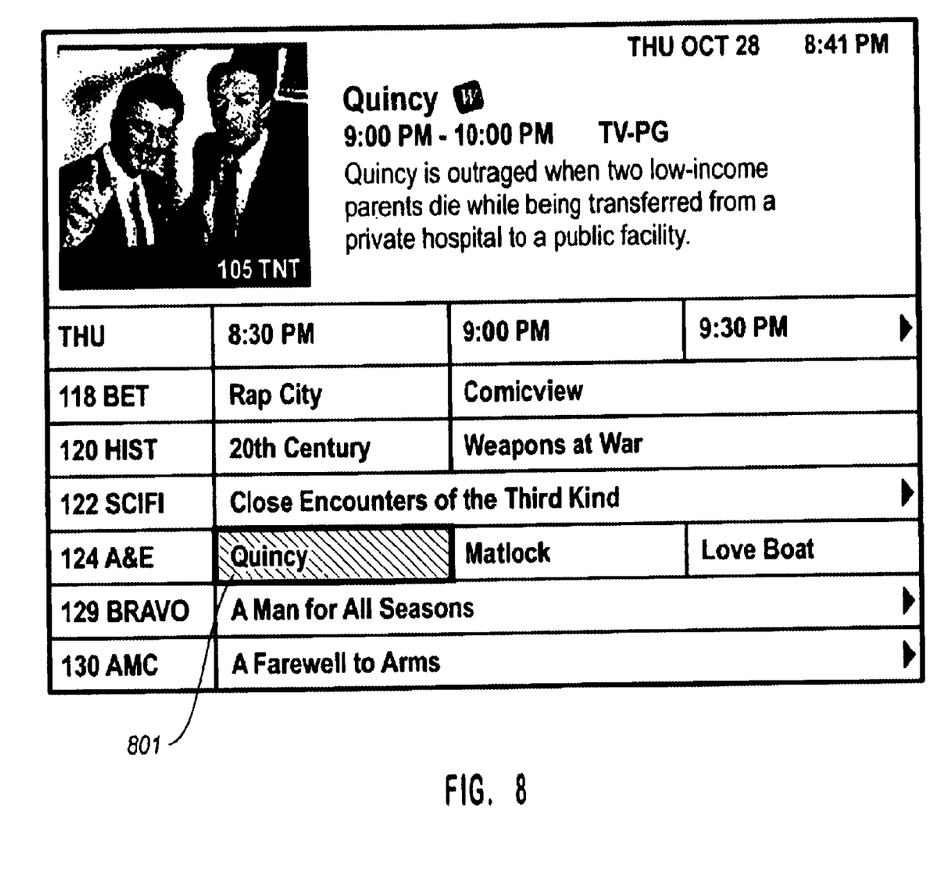
FIG. 8 is a screen shot illustrating guide data that shows locked programming content.

FIGS. 7 and 8 more fully illustrate an example of visual cues. FIG. 7 and 8 are screen shots showing guide data. In FIG. 7, program 701 of channel 124 is currently selected. In FIG. 8, program 801 of channel 124 is selected. Program 701 is the same as program 801, with the difference that the program 801 is locked while the program 701 is not locked. The visual cue provided to a user to show that the program 801 is locked is that the selected channel 124 and program 801 are dimmed. In contrast, the program 701 on the selected channel 124 is not dimmed. Rather the selected channel 124 and program 701 are highlighted to indicate that neither the channel 124 nor the program 701 is locked. In addition, when the program 801 is selected, a lock icon 800 is shown to indicate to a user that the selected program or channel is locked. Alternatively, a locked channel or program may be displayed in a color different from the color used to display channels or programs that are unlocked. In this manner, visual cues may be used to indicate that a selected channel or program is locked.

FIG. 3 is also an example of guide data that is usually included in the programming content 200. FIG. 3 presents a portion of the guide data in a grid or table format to a user. The number of channels actually available in the programming content 200 cannot usually be simultaneously displayed on the display 204. A scroll bar or other system is usually provided to the user such that other channels to be displayed as desired. Within the guide data grid of FIG. 3, box 301 and box 302 are used, in this example, to identify a particular channel that is available within the programming content. Boxes 303, 304, and 305 identify specific programs that are available through channel 1, identified in box 301, while boxes 306 and 307 identify the specific programs that are available through channel 50, identified in box 302.

The program starting times, program duration, and program ending times may be derived from the time information in the row 308. The time period displayed in row 308 is dependent on the current time as well as user preferences. Often, a default time period is used for displaying the guide data. As illustrated by box 303, the program 1 has a start time of 7:00, an end time of 7:30 and a program duration of thirty minutes. The program identified by box 304 has a start time of 7:30, an end time of 8:30 and a program duration of one hour. Thus, the display of guide data 206 as shown by FIG. 3 provides a user with information about the programming content 200.

Figure 4:
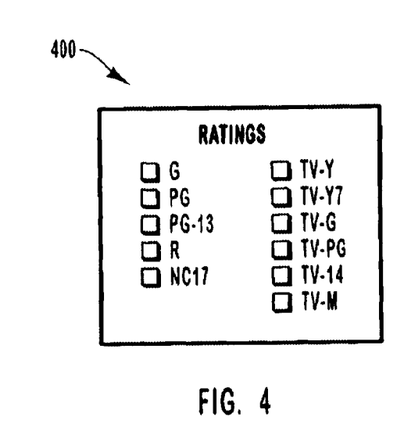
FIG. 4 illustrates ratings that may be associated with the programming content.

FIG. 4 illustrates ratings 400, which is another type of guide data 206. The ratings 400 are used to describe the content of the programming content 200. Because the set top box 202 is capable of receiving both television programming, satellite programming, cable programming and the like, the ratings provided in the guide data may differ according to the source of programming content. In addition, the ratings 400 may differ based on the type of programming content. For example, movies typically use the following ratings: G, PG, PG-13, R, and NC-17. Regular television programming, on the other hand typically uses the following ratings: TV-Y, TV-Y7, TV-G, TV-PG, TV-14, ad TV-M.

Movie ratings and their associated characteristics are intended to assist a user in assessing a movie. A movie with a G rating has no age requirements and does not contain profanity, sex, drug use or violence. A movie with a PG rating is typically not suitable for small children and may contain mild profanity, mild violence, brief nudity, and little violence. A movie with a PG-13 rating implies that the movie may not be appropriate for children under the age of 13 and may contain violence, nudity, sensuality, strong language and drug use. A movie with an R rating suggests that no one under 17 years of age should view the movie unless accompanied by a guardian or an adult and may contain tough violence, hard language, drug abuse and nudity in sensual scenes. A movie with an NC-17 rating is not supposed to be viewed by those younger than 17 years of age and may contain graphic violence, explicit sex, heavy drug abuse and aberrational behavior.

Television ratings are intended to assist a user in assessing television programming. The TV-Y rating applies to programming that is designed for small children. The TV-Y7 rating is directed towards older children and may contain mild physical or comedic violence that may frighten children under the age of 7. The TV-G rating is intended for general audiences and contains little violence, no strong language and little sexual dialogue. The TV-PG rating suggest parental guidance because the programming content may contain limited violence, some sexual dialogue or situations, and some coarse language. The TV-14 rating is intended to strongly caution parents because the programming content may contain strong language, intense violence and sexual content. The TV-M rating applies to programming content directed towards mature audiences because of the mature themes, profane language, graphic violence and explicit sexual content that may be contained in the programming content.

Because the ratings data may be illustrated using a few letters and numbers, the ratings data is often placed within the guide data grid illustrated in FIG. 3. For example, the program 1 identified in box 303 has a rating block 310. In this example, channel 1, identified in box 301, is a television channel and the rating block 310 shows a rating of TV-14. Some programs, such as news programs, often do not have a rating. Also, other types of programming content which may be accessed through the set top box, such as video games, may have a different rating system while other types of programming content, such as Internet web sites and Internet related data, may not have a rating system.

Figure 5:
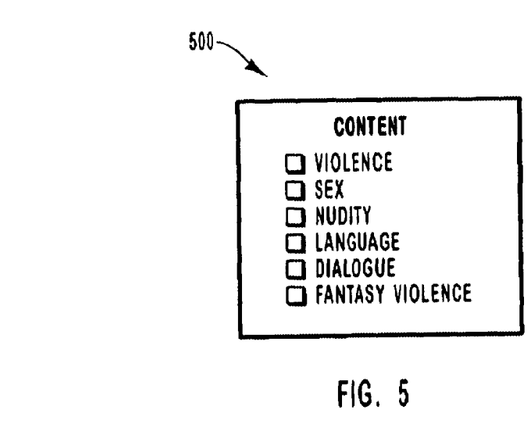
FIG. 5 illustrates content identifiers that may be associated with the programming content.

Another type of guide data 206 is illustrated in FIG. 5, which shows the content 500. The content 500 is similar to the ratings 400 shown in FIG. 4 in that the programming content is being described. While the ratings 400 is more of an age appropriate description of the programming content, the content 500 more fully describes the type of content in the programming content.

The content 500 has a variety of content identifiers used to describe the content of the programming content. The letter V is used to represent violence, an S represents sex, an L indicates offensive language, a D indicates dialogue and sexual innuendo, and FV is used to indicate fantasy or cartoon violence. In FIG. 3, the content identifiers of L and V are also provided in box 310.

The combination of the content 500 and the ratings 400 often provides a user with a more clear indication about the content of a particular program. For instance, a program with a rating of "TV-14 S,V" reveals to a user that the program contains sex and violence that may be inappropriate for viewers younger than 14 years of age. The rating also reveals to a user that the program does not contain the language and nudity or other content that are associated with the TV-14 rating. This does not indicate, however, that the programming does not contain that type of content to a lesser degree. In other words, the program may have language and nudity or other characteristics that are associated with a TV-PG rating.

Referring again to FIG. 2, the guide data 206 as described herein may be used to both create configurable and flexible locks 208 and unlock existing locks. The locks 208, in one embodiment, are created from the guide data 206 that is provided and displayed to a user. The guide data grid shown in FIG. 3 is often displayed to a user on the display 204 and a user, using a remote control or other device, is able to identify specific programs or channels displayed on the grid that are to be locked. Because the guide data grid often indicates to a user which channels or programs are locked, the guide data may also be used to identify specific programs or channels that are to be unlocked.

For example, a user may identify that programs 1 and 3 of channel 1 be locked while allowing programs 2 and 4 to be viewed. Alternatively, a user may select to lock channel 50, in which case none of the programs available on channel 50 may be viewed. In another example, the user may choose to select all programs on all channels that occur between 7:00 p.m. and 7:30 p.m. Alternatively, a user may block program 2 on channel 1 from 7:00 to 7:30 only, while blocking program 5 on channel 50. In sum, a user has the ability to create many different locks solely from the information presented in the guide data grid illustrated in FIG. 3.

The ability of a user to create flexible locks is further enhanced by considering other types of guide data 206 such as ratings 400 and content 500. The addition of the ratings 400, for example, permits a user to lock all programs on a particular channel having a PG-13, R, or NC-17 rating. Alternatively, a lock can be configured to only lock those programs on a particular channel or set of channels. For example, when a user is receiving satellite or cable programming content, the user can designate that all movies on the movie channels having an R or an NC-17 rating are to be locked. In this example, a movie with an R rating shown on a non-movie channel would not be affected by the lock.

In a similar manner, the content 500 may be used to configure or create a lock. For example, all programs having sex and violence content identifiers may be locked. Alternatively, all television programs having a TV-M rating with nudity and sex content identifiers may be locked. In sum, a user has the ability to create flexible programming locks using various sources or types of guide data.

However, there are other types of information which may be considered when creating locks. For example, a lock may be set on a particular channel depending on the type of channel. If the channel is a pay per view channel or a premium movie channel, a lock may be created based on that factor or characteristic. If desired, a user has the capability to create a lock based on the actors or any other type of information that is related to either a channel or a program. In the case of Internet data, a lock may be created by any available rating or content guide, by web site address or another factor. In other words, the locks that can be created or altered by a user in accordance with the present invention are highly configurable and adaptable to the requirements of a particular user.

The creation or alteration of programming locks are typically accomplished through a user interface shown on a display. In many instances, the guide data grid, as illustrated in FIG. 3, is presented to a user and the user may select those programs, channels, time periods, and the like that are to be locked using a remote control, keyboard or other input device. If the user desires to incorporate the ratings or the content identifiers into a particular lock, then another screen or display such as those illustrated in FIGS. 4 and 5 are presented to the user. On these screens, the user can simply mark or check those factors that are to be included in the lock being created or altered. A lock is typically created with an access code or password such that the lock may be deleted or altered at a later time. While the display is only capable of displaying a portion of the guide data, a user is not limited to the information that is actually displayed on the screen, but may create locks for future times and dates as well by causing the appropriate guide data to be displayed.

The guide data 206 may also be used to unlock programming content. Often, locks are set based on either channel or rating. When a channel is locked, none of the programming content on that channel will be shown to a user. A user has the ability, in accordance with the present invention, to unlock channel, in which case all of the programs on that channel are unlocked. When a rating lock is used, then programs with that rating will be locked. Thus, unlocking a rating lock preferably affects only the locked program, as opposed to all the programs on the channel.

Locks can also be permanently or temporarily disabled or unlocked. For example, if a user desires to watch a particular program that is locked and the user has the ability to change that lock, then the lock can be temporarily disabled or unlocked until some event occurs. Exemplary events include, but are not limited to, turning off the set top box, the termination of a program, the expiration of a time period, the start of the next program, logging on the set top box, logging off the set top box, and the like.

Two types of locks that are temporarily unlocked in one embodiment are rating locks and channel locks. Rating locks are usually specific to a particular program or set of programs. When a rating lock is unlocked or disabled, then the user has access to those programs. When the rating lock is later enabled upon the occurrence of an event, then the user no longer has access to those programs unless the rating lock is again unlocked. A channel lock typically restricts access to a channel, which usually has many programs associated with it. When a channel lock is unlocked, then all of the programs on that channel may be accessed regardless of the ratings or content identifiers of those programs. When the channel lock is restored, then access to all programs on that channel is again restricted by the lock.

For example, if a program has a ratings lock, a user can temporarily unlock the ratings lock. Usually, the user must first demonstrate that they have authority to alter or unlock the existing lock. This is often accomplished by having the user supply a password. Once the user is sufficiently identified or verified, then the ratings lock is temporarily removed until the program terminates, at which point the ratings lock is re-enabled or restored. Thus, the ratings lock is automatically enabled when the program ends and users does not have to concern themselves with having to repeatedly lock and unlock selected programming.

For example, if a parent user desires to watch a movie having an R rating and all movies having R ratings are currently locked to prevent children users from viewing those movies, then the parent user may temporarily unlock that specific program. After the program ends, the temporarily disabled lock is restored and that program is again locked. Thus the event that re-enables the disabled lock is the termination of the program.

In another example where a channel lock exists, temporarily removing the channel lock results in all programs on that channel becoming available. The lock is not restored on the termination of a particular program because no specific program was identified by the user removing the lock. In this case, an exemplary event that restores the channel lock is turning the set top box off. When the set top box is later turned on, the channel lock is restored. More generally, locked programming can be unlocked by having a user identify guide data. Locked programming that matches the identified guide data can be either permanently unlocked or temporarily unlocked until the occurrence of some event as described above.

Figure 6:
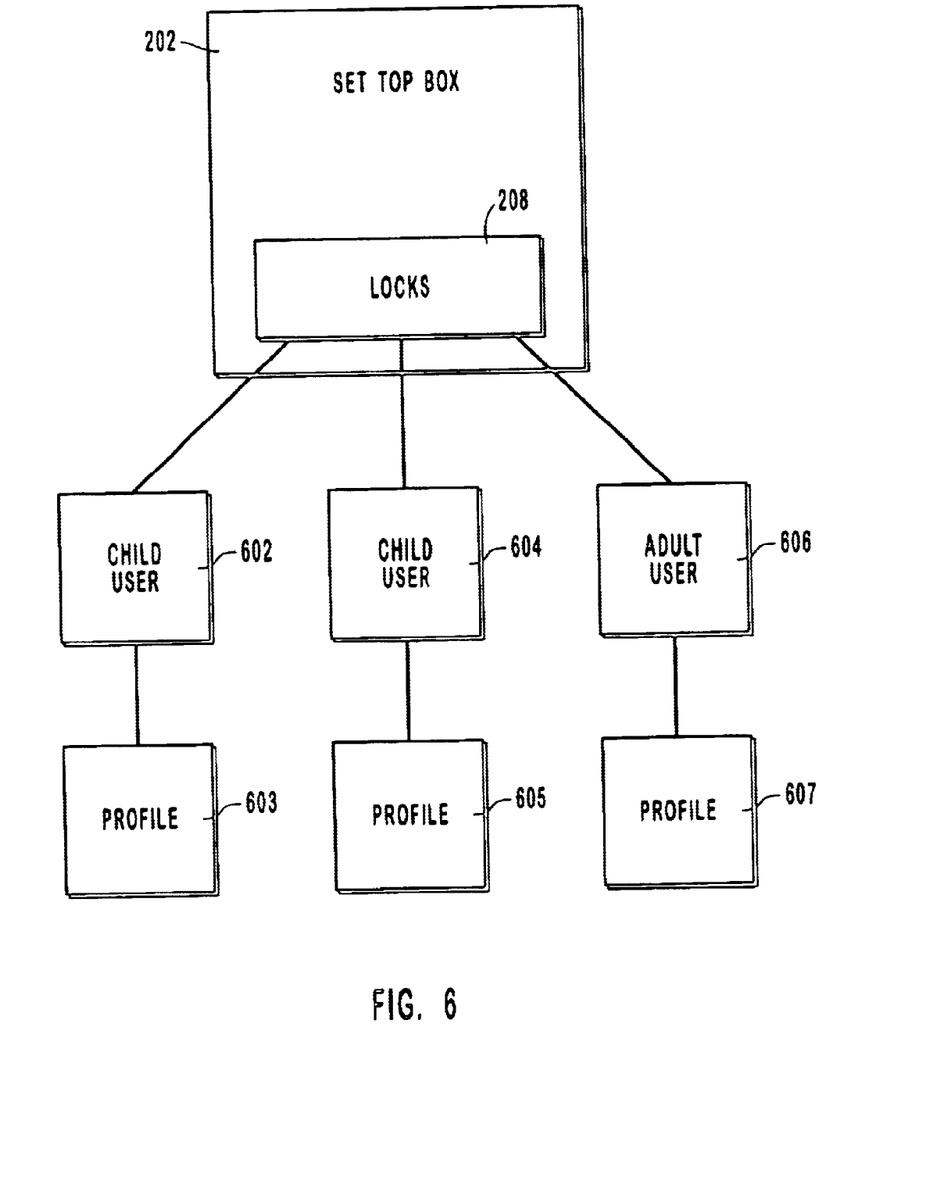
FIG. 6 illustrates the use of locks according to user profiles.

Another factor that is often used to create, unlock or alter a lock is based on the user of the set top box or on a profile of a user. This ability is advantageous when a set top box can be accessed or used by more than one person because the programming content accessed by a particular user can be controlled using the profile of that user. This type of situation may occur, for example, in a family setting where the parents and the children all have access to the set top box 202. FIG. 6 illustrates a set top box 202 that has multiple users.

Profile locks are most effective when a user is required to log on to the set top box. This can be accomplished, for example, by not allowing a user to access any programming content until the user logs on. Alternatively, the programming information can be locked to prevent access to all programming content having certain ratings or by locking certain channels. In order to access the locked programming data, the user must log on. When the user logs on, the profile of the user can be examined to determine how much of the locked programming content will be unlocked for the current user. Profile locks are temporary and usually only last until the user logs off the set top box. Alternatively, the profile lock will terminate when the set top box is turned off.

In the example shown in FIG. 6, the set top box 202 has a child user 602 with a profile 603, a child user 604 with a profile 605, and an adult user 606 with a profile 607. The adult user 606, who may be a parent or guardian, has the ability to create, unlock or otherwise alter locks 208 that are based on the profiles 603 and 605 of the respective child users 602 and 604. If the child user 602 is only 5 years old, this information will be reflected in the profile 603 and a lock may be created that only allows the child user 602 to view programming having either a TV-Y or G rating. If all the programming content is initially locked when the child user 602 logs on the set top box 202, then the programming content having either a TV-Y, G or similar rating will be unlocked for the child user 602. The remaining programming content will remain locked. In other words, the locks for the programming content received by a set top box are created, altered, or unlocked according to the profile of the user logging on the set top box. The profile of a user may be an additional factor that is used to create, alter or unlock the locks 208.

For example, if a profile of the child user 602 states that the child user 602 may not have access to programming content having an R rating and the adult user 606 creates a profile lock that restricts access to programming having an R rating, then the profile of the child user 602 is contained within the guide data that defines the profile lock and the programming content having an R rating will be locked. In another embodiment, the guide data selected by the adult user 606 may contain other guide data such as content identifiers. Thus, if the profile 603 of the child user 602 indicates that the child user is restricted from viewing movies having an R rating and a nudity content identifier, then movies having an R rating and a violence content identifier will not be locked. On the other hand, if the movie has an R rating and both nudity and violence content identifiers, then the movie will be locked. In other words, a profile lock may require the profile of the client or restricted user to match a portion of the guide data that defines or describes the profile lock.

Profile locks persist only while the user is actively using the set top box 202. When the set top box 202 is turned off or the user logs out, then the locks that were created or removed based on the profile of that user are accordingly removed or re-enabled. If the user attempts to access locked programming content, the client user is denied access to the programming content. However, exceptions can be created with user's profiles. For example, if a user's profile prevents a user from viewing a particular channel and a supervisor or parent user decides that the user may now have access to that particular channel, then the profile may be altered such that the particular channel is unaffected by the profile of the user even if the programming content of that channel would otherwise be locked.

When programming content is received at the set top box, the programming content is typically tuned to a channel identified by a user of the set top box. If the tuned channel is locked, or if the program on the tuned channel is locked, then the user is prevented from accessing that programming content unless the lock is removed or unlocked. In order to unlock the programming content, a user may be prompted for a password or other identification. Then, the programming content may be temporarily unlocked as described above.

The locks 208 can also be applied to various applications. For example, when a user desires to record a program, a record button may be provided to the user via the user interface after the program to be recorded has been identified. If the program, however, is locked, then the record button will not be provided to the user and the user will be unable to record the program. Alternatively, the record button can be displayed to the user, but made inoperable by the lock. In either event, the user may not use the record application to record a locked program.

In another example, a user may choose to set reminders about certain programs that notify the user about the selected programs. If the selected program is locked, then the user will either not be able to set a reminder on the locked program or the user will not be reminded about the program because it is locked. In the case where a program is locked after a record or remind function has already been identified and activated by a user, the record or remind function is simply disabled when the program associated with the record or remind function is locked. Alternatively, the user that set the record or the remind function may be notified that the record or remind function has been deactivated. Alternatively, the user can be informed that there is a pending record or remind function at which point the user may choose to proceed with the lock and remove the pending record or remind function or to simply terminate the lock.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a set top box having a graphical user interface including a display, a method of controlling access by a user to programming content, the method comprising the steps of:

displaying guide data on the display to the user, wherein the guide data describes the programming content;

receiving input from the user identifying one or more portions of the programming content to be recorded;

determining if the one or more portions of the programming content identified by the user are locked; and refraining from displaying a record button on the display to the user if the one or more portions of the programming content are locked.

2. A method as defined in claim 1, further comprising the steps of:

receiving, at the set top box, the guide information describing the programming content;

receiving input from the user selecting a portion of the guide information; and enabling a lock on the portion of the programming content such that the portion of the programing content is locked according to the portion of the guide information selected by the user.

3. A method as defined in claim 1, wherein the guide information comprises at least one of: program title, program start time; program end time; program duration; channel; rating, and content identifier.

4. A method as defined in claim 1, wherein the step of selecting a portion of the guide information further comprises the step of identifying at least one program to be locked.

5. A method as defined in claim 1, wherein the step of selecting a portion of the guide information further comprises the step of identifying at least one channel in the programming content to be locked.

6. A method as defined in claim 1, wherein the step of selecting a portion of the guide information further comprises the step of identifying at least one rating.

7. A method as defined in claim 1, wherein the step of selecting a portion of the guide information further comprises the step of identifying at least one content identifier.

8. A method as defined in claim 1, further comprising the step of preventing the locked portion of the programming content from being accessed.

9. A method as defined in claim 1, further comprising the step of preventing a user from recording the locked portion of the programming content.

10. A method as defined in claim 1, further comprising the step of disabling a reminder associated with the locked portion of the programming content.

11. A method as defined in claim 1, further comprising the steps of:
   temporarily disabling the lock on the locked portion of the programming content until an occurrence of an event; and
   re-enabling the lock on the locked portion of the programming content upon the occurrence of the event.

12. A method as defined in claim 1, further comprising the steps of:
   receiving input from a supervisor user creating a lock on the programming content;
   examining a profile of the user when the user logs on the set top box; and
   altering the lock on the programming content based on the profile of the user such that a portion of the programming content is accessible by the user according to the profile of the user.

13. A method as defined in claim 12, wherein the step of creating a lock further comprises the steps of:
   displaying guide information to the supervisor user; and
   receiving input from the supervisor user selecting a portion of the guide data, wherein the portion of the guide data describes the portion of the programming content.

14. A method as defined in claim 12, wherein the step of altering the lock further comprises the step of unlocking the portion of the programming content.

15. A method as defined in claim 14, where in the step of unlocking the lock further comprises the steps of:
   comparing the portion of the guide data with the profile of the user;
   disabling the lock for the portion of the programming content where the profile of the user is not contained within the portion of the guide data; and
   refraining from disabling the lock for the programming content where the profile of the user is contained within the portion of the guide data.

16. A method as defined in claim 12, wherein the step of altering the lock further comprises the step of locking additional programming content.

17. A method as defined in claim 12, further comprising the steps of restoring the lock on the programming content on an occurrence of an event.

18. A method as defined in claim 17, wherein the event is one of turning off the set top box and logging out of the set top box by client user.

19. A method as defined in claim 13, wherein the step selecting a portion of the guide data further comprises at least one of the steps of:
   identifying at least one program to be locked;
   identifying at least one channel in the programming content to be locked;
   identifying at least one rating; and
   identifying at least one content identifier.

20. A method as defined in claim 19, wherein the at least one content identifier comprises at least one of: violence; sex; nudity; language; dialogue; and fantasy violence.

21. A method as defined in claim 19, wherein the at least one rating comprises at least one of: G; PG; PG-13; R; NC-17; TV-Y; TV-Y7; TV-G; TV-PG; TV-14; and TV-M.

22. A method as defined in claim 1, further comprising the steps of:
   receiving input from the user identifying a portion of the programming content, wherein the portion of the programming content is locked, and wherein the lock associated with the portion of the programming content is one of a channel lock and a rating lock;
   unlocking a channel of the portion of the programming content if the lock is the channel lock;
   unlocking a program of the portion of the programming content if the lock is the rating lock; and
   enabling the lock upon an occurrence of an event.

23. A method as defined in claim 22, wherein the step of unlocking a channel further comprises the step of unlocking all programs within the channel.

24. A method as defined in claim 22, wherein the step of unlocking a program further comprises the step of refraining from unlocking other programs.

25. A method as defined in claim 22, wherein the step of enabling the lock occurs automatically.

26. A method as defined in claim 22, wherein the event is one of turning off the set top box; logging out of the set top box by the user; and termination of the unlocked program.

27. For a set top box having a graphical user interface including a display, a computer program product comprising one or more computer readable media carrying computer executable instructions that implement a method of controlling access by a user to programming content, the method comprising steps of:
   displaying guide data on the display to the user, wherein the guide data describes the programming content;
   receiving input from the user identifying one or more portions of the programming content to be recorded;
   determining if the one or more portions of the programming content identified by the user are locked; and
   refraining from displaying a record button on the display to the user if the one or more portions of the programming content are locked.

28. A computer program product as defined in claim 27, the method further comprising steps of:
   tuning, at the set top box, to a program of a channel;
   if the channel is locked by the lock:
      determining if the user is authorized to unlock the lock; and
      unlocking the channel until an occurrence of an event; and
   if the program is locked by the lock:
      determining if the user is authorized to unlock the lock; and
      unlocking the program until the occurrence of the event.

29. A method as defined in claim 28, wherein the step of unlocking the channel further comprises the step of unlocking each program of the channel until the occurrence of the event.

30. A method as defined in claim 28, wherein the step of unlocking the program further comprises the step of refraining from unlocking other programs within the programming content.

31. A method as defined in claim 28, further comprising the step or restoring the lock on the channel upon the occurrence of the event.

32. A method as defined in claim 28, wherein the event is one of turning off the set top box, logging off the set top box, and termination of the program.

33. A computer program product as defined in claim 27, method further comprising steps of:

receiving, at the set top box, the guide information describing the programming content;

receiving input from the user selecting a portion of the guide information; and enabling a lock on the portion of the programming content such that the portion of the programming content is locked according to the portion of the guide information selected by the user.

34. A computer program product as defined in claim 27, the method further comprising steps of:

receiving input from a supervisor user creating a lock on the programming content;

examining a profile of the user when the user logs on the set top box; and altering the lock on the programming content based on the profile of the user such that a portion of the programming content is accessible by the user according to the profile of the user.

35. A computer program product as defined in claim 27, the method further comprising steps of:

receiving input from the user identifying a portion of the programming content, wherein the portion of the programming content is locked, and wherein the lock associated with the portion of the programming content is one of a channel lock and a rating lock;

unlocking a channel of the portion of the programming content if the lock is the channel lock;

unlocking a program of the portion of the programming content if the lock is the rating lock; and enabling the lock upon an occurrence of an event.

\* \* \* \* \*

UNITED STATES PATENT AND TRADEMARK OFFICE
CERTIFICATE OF CORRECTION

| | |
|---|---|
| PATENT NO. | : 6,785,901 B1 |
| APPLICATION NO. | : 09/575413 |
| DATED | : August 31, 2004 |
| INVENTOR(S) | : Horiwitz et al. |

Page 1 of 2

It is certified that error appears in the above-identified patent and that said Letters Patent is hereby corrected as shown below:

On Sheet 5 of 6, in FIG. 7, line 4, before "die while" delete "parents" and insert -- patients --, therefor.

On Sheet 6 of 6, in FIG. 8, line 4, before "die while" delete "parents" and insert -- patients --, therefor.

In column 5, lines 44-55, after "used."
delete "FIG. 2 is a block diagram illustrating an exemplary set top box that receives programming content that may be displayed to a user on a display device. The set top box 202, which receives programming content 200, is representative of analog and digital devices including, but not limited to, satellite receivers, digital recording devices, cable boxes, video game consoles and the like or any combination thereof. In addition, the set top box 202 typically includes a computer or portions of a computer as described with reference to FIG. 1. Additionally, the set top box 202 is usually capable of connecting with a network such as the Internet." and
insert -- FIG. 2 is a block diagram illustrating an exemplary set top box that receives programming content that may be displayed to a user on a display device. The set top box 202, which receives programming content 200, is representative of analog and digital devices including, but not limited to, satellite receivers, digital recording devices, cable boxes, video game consoles and the like or any combination thereof. In addition, the set top box 202 typically includes a computer or portions of a computer as described with reference to FIG. 1. Additionally, the set top box 202 is usually capable of connecting with a network such as the Internet. --, therefor on line 45.

In column 7, line 30, delete "ad" and insert -- and --, therefor.

In column 12, line 55, in Claim 2, delete "programing" and insert -- programming --, therefor.

UNITED STATES PATENT AND TRADEMARK OFFICE
CERTIFICATE OF CORRECTION

PATENT NO. : 6,785,901 B1
APPLICATION NO. : 09/575413
DATED : August 31, 2004
INVENTOR(S) : Horiwitz et al.

It is certified that error appears in the above-identified patent and that said Letters Patent is hereby corrected as shown below:

In column 13, line 46, in Claim 15, after "claim 14," delete "where in" and insert -- wherein --, therefor.

In column 15, line 6, in Claim 31, delete "or" and insert -- of --, therefor.

In column 15, line 12, in Claim 33, before "method" insert -- the --.

Signed and Sealed this

Thirty-first Day of March, 2009

JOHN DOLL
*Acting Director of the United States Patent and Trademark Office*